Feb. 27, 1923.
1,446,942.
M. W. SON.
COMBINED BUMPER AND FENDER FOR AUTOMOBILES.
FILED MAY 1, 1922.
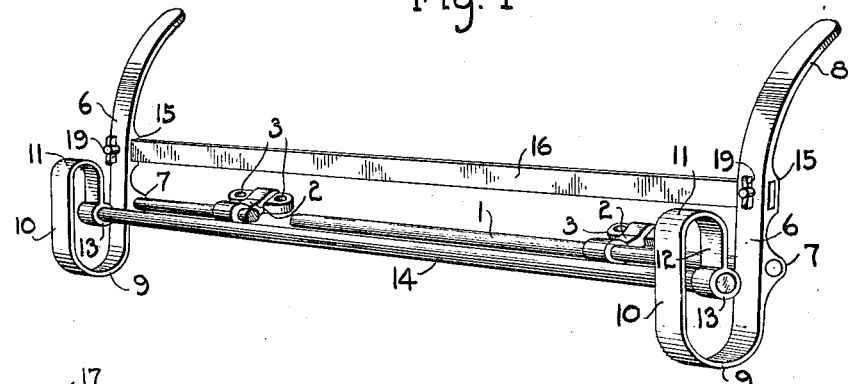
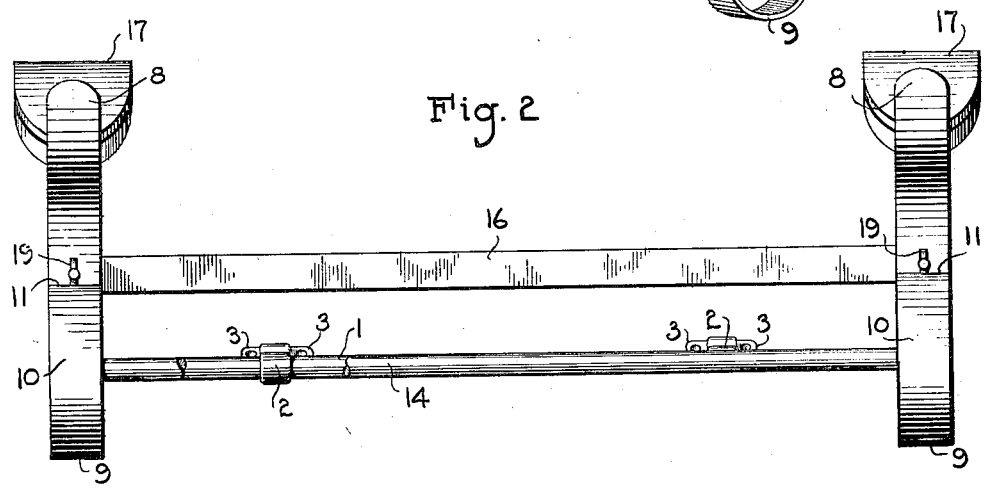
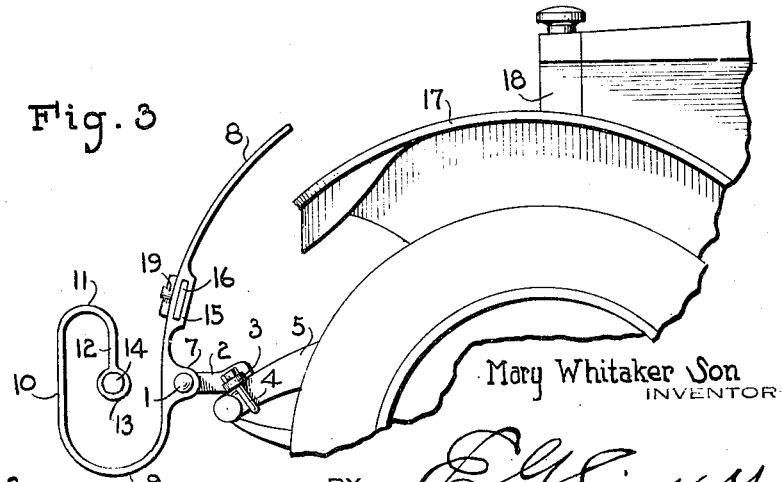
Mary Whitaker Son
INVENTOR
WITNESSES Patented Feb. 27, 1923.

1,446,942

UNITED STATES PATENT OFFICE.

MARY WHITAKER SON, OF GLOVERSVILLE, NEW YORK.

COMBINED BUMPER AND FENDER FOR AUTOMOBILES.

Application filed May 1, 1922. Serial No. 557,762.

*To all whom it may concern:*

Be it known that I, MARY WHITAKER SON, a citizen of the United States, residing at Gloversville, in the county of Fulton and State of New York, have invented a new and useful Combined Bumper and Fender for Automobiles, of which the following is a specification.

This invention relates to bumpers for automobiles, and has for its object to absorb and neutralize shocks to automobiles when they collide with another automobile or with some object; and also to provide a protection for the front end of the front fenders.

Bumpers for automobiles have been constructed in which springs are employed to neutralize to some extent the jars incident to collisions between an automobile and some other object, but the springs are so placed relative to the impact-receiving member and the chassis, that they receive all the strain, and being unable to stand the strain, they readily break or become twisted, or bent out of shape.

It is an object of my invention to resiliently suspend that part of the bumper which receives the impact so that the strains are transmitted to all parts of the springs, instead of being concentrated at certain points, whereby the springs will not only absorb and neutralize the force of the impact, but will act as a cushion between the impact-receiving member and the chassis.

I attain this end by resiliently supporting the impact-receiving member on the ends of the springs, which ends are located in spaced relation to other portions of the springs, whereby the impact-receiving member is free to move in a plurality of different directions.

The invention will be best understood from a consideration of the following detailed description taken in connection with the accompanying drawing forming part of this specification, with the understanding, however, that the invention is not cofined to any strict conformity with the showing in the drawing, but may be changed and modified so long as such changes and modifications mark no material departure from the salient features of the invention as expressed in the appended claims.

In the drawing:—

Fig. 1 is a view in perspective of the bumper.

Fig. 2 is a front view of the bumper having certain parts in protecting relation with the mud guards or fenders of an automobile.

Fig. 3 is a side elevation of the bumper sceured to the end of the chassis and disclosing an extension of the bumper in spaced protecting relation with the mud guard or fender of the automobile.

Referring to the drawing, a horizontal rod 1 is supported transversely in front of an automobile by means of brackets 2, having perforated ears 3 extending laterally outward from its inner end and which are adapted to receive the ends of a U-bolt 4. The U-bolts embrace the forward ends of the side channel members 5 of the automobile frame, and are locked to the perforated ears of the bracket 2 by means of nuts, thus clamping the brackets to the channel members. The forward ends of the brackets are provided with eyes, through which the rod 1 is passed, the brackets being spaced from each other and inwardly from the ends of the horizontal rod 1.

On the outer ends of the horizontal bar 1 are rigidly mounted springs 6, the ends of the rod passing through perforations in an enlargement or boss 7, extending rearwardly of the front face of the springs. Each of the springs 6 is formed of a body member having an upwardly and inwardly curved extension 8, a curved outwardly-projecting portion 9, a vertical portion 10, an inwardly curved portion 11, and a downwardly-extending portion 12. The ends of the downwardly-extended portions 12 of the spring are formed into eyes 13, in which are rigidly secured the opposite ends of a horizontal impact-receiving member or rod 14, which is spaced in front of the rod 1 and in the same horizontal plane.

The eye 13 and the downwardly-extending portion 12 of the spring are spaced from and located substantially midway between the vertical portion 10 and the body member 6 of the spring.

The curved bend 9 is about twice as long as the curved bend 11, with the result that it is stiffer and less resilient. The springs are each of the same diameter throughout their length. They are shown as made of a single piece, but the extension 8 could be formed separately and attached in place.

To the rear of the body member 6, and located above the enlargement 7, is a box-like enlargement 15 preferably integrally formed with the member, and provided with a rectangular socket. Into these sockets are inserted the ends of a horizontal flat bar 16, which is substantially in the same vertical plane and parallel with the transverse bar 1.

Set screws 19 passing through perforations in the body member 6 and into the ends of the bars 16, lock the bars in position.

As shown in Fig. 3, the upper extension 8 of the spring 6 is spaced from and overhangs and overlaps the front end of the mud guard or fender 17 of an automobile and therefore provides a shield to prevent injury to the ends of said mud guards or fenders.

The springs 6, when viewed in side elevation, are substantially C-shaped and are each made up of a partial convolution or coil with the end of the spring extended inwardly within the partial coil to provide the suspended member 12, which is spaced from and located between the intermediate portions of said spring so as to be free to move back and forth, whereby the rod 14 is spring-supported at each end, and is free to move in a plurality of different directions, radiating from the impact-receiving member 14 as a center, so that no severe strains are concentrated upon one portion of the spring, but are transmitted to all parts of the spring.

The bar 16, being located above the horizontal rod 1, is spaced from and in front of the radiator 18 and acts as a guard to protect the radiator from severe injury in case the automobile equipped with the bumper collides with some other automobile or with some object. Said bar being supported at its ends by the upper portion 8 of the spring member, is likewise resiliently suspended and therefore will rebound in the event of an impact with said bar.

This device not only functions as an efficient bumper, but protects the radiator as well as the front ends of the front fenders, and in this respect is unique.

What is claimed is:—

1. A bumper for automobiles, comprising an impact-receiving member, means for resiliently supporting the ends of said impact-receiving member in spaced relation with the frame of the automobile, said impact-receiving member by reason of its resilient suspension being free to move to the same extent in a plurality of different directions, said resilient supporting means being located at each side of the automobile in front of the fenders and having a part to overhang the front end of each fender and form a protection therefor.

2. A bumper for automobiles, comprising horizontal rods supported in spaced relation with the automobile frame, spring means for connecting the ends of one of the rods to the ends of the other rod, the ends of the first-mentioned rod being resiliently suspended between intermediate portions of the spring means.

3. A bumper for automobiles, comprising horizontally-extending rods, spring means for connecting the ends of one of the rods to the ends of the other rod, means for rigidly securing one of said rods to the automobile frame, the ends of the other rod being resiliently suspended between and spaced from intermediate portions of the spring means.

4. A bumper for automobiles, comprising a horizontal rod, a support secured to the automobile frame, springs for connecting and resiliently suspending said rod from said support in spaced relation from the end of the frame and also in spaced relation to said support, the ends of the rod being located within and spaced from each spring, and a transverse bar connecting the springs above the plane of said rod for protecting the radiator.

5. A bumper for automobiles, comprising a support secured to the frame of the automobile, spaced springs, one at each end, each spring being secured to the support, then curved downwardly and outwardly, then extending upwardly, then curving inwardly and downwardly, and a horizonal bar connected at its ends to the ends of the springs and spaced from all other portions of the springs.

6. A bumper for automobiles, comprising a support secured to the frame of the automobile, spaced springs secured to the support, one at each end, said springs each comprising a wide curved bottom, a vertical portion, a narrow curved top and a downwardly-extending end, a horizontal rod connected at its ends to the downwardly-extending ends, whereby the rod is resiliently supported and is free to move in different directions without contacting with the spring or the automobile.

7. A bumper for automobiles, comprising brackets secured to the automobile frame, a rod supported on the brackets, spaced springs mounted intermediate their ends on the rod, said springs being curved downwardly and outwardly, then extending upwardly, then curving inwardly and then extending downwardly, an impact-receiving rod connected to the ends of the springs at the inwardly and downwardly curved portions, and a bar connected at its ends to the intermediate portion of the springs and in spaced relation with and above the plane of said rod for protecting the radiator against injury.

8. A bumper for automobiles, comprising brackets secured to the automobile frame, a rod supported on the brackets, spaced springs mounted intermediate their ends at the ends of the rod, an impact-receiving rod connected at its ends to the free unsupported ends of the springs, said springs each having an upward extension in protecting relation with the front ends of the fenders of the automobile.

9. A bumper for automobiles, comprising an impact-receiving bar, a support secured to the frame of an automobile, spring means for connecting and resiliently suspending said bar from said support in spaced relation with the end of the frame, said springs being each extended upwardly and rearwardly so as to overhang the front end of the fender of the automobile.

10. A bumper for automobiles, comprising an impact-receiving bar, a support secured to the end of the frame of an automobile, spring means for connecting and resiliently suspending said bar from said support in spaced relation with the end of the frame, said springs having their inner ends extended upwardly and rearwardly in protecting relation with the fenders, and a transverse bar connecting the upwardly-extended portions of the springs and adapted to protect the radiator of the automobile.

11. A bumper for automobiles, comprising an impact-receiving bar, a support secured to the frame of an automobile, spring means for connecting and resiliently suspending said bar from said support in spaced relation from the end of the frame, and a bar resiliently supported by the spring means in spaced relation with the radiator of the automobile for protecting the same.

12. A bumper for automobiles, comprising a pair of horizontally-disposed rods, means for securing one of said rods to the frame of an automobile, and a pair of spring members secured to the rigidly mounted rod at each end and extending forwardly, each spring formed with a wide curved bottom, a substantially vertical portion, a narrow curved top and a downwardly extending end which is spaced from all parts of the spring, the other rod being secured at its ends to downwardly extending ends of the spring so as to be free to move in different directions.

13. A bumper for automobiles, comprising a support, spring members, one at each of the support, and secured thereto and extending forwardly, and an impact-receiving rod, the free end of each spring member being secured to the ends of said rod, and the rod ends being arranged within the convolution of each spring and supported solely thereby.

14. A bumper for automobiles, comprising a support, spring members, one at each end of the support, and secured thereto and extending forwardly, and an impact-receiving rod, the free end of each spring member being secured to the ends of said rod, and the rod ends being arranged within the convolution of each spring and supported solely thereby, the other end of each spring member being extended upwardly above the said support and curved rearwardly so as to overhang the front end of the front fender.

In testimony, that I claim the foregoing as my own, I have hereto affixed my signature.

MARY WHITAKER SON.